March 6, 1951     H. H. BAGGS     2,544,003
SCREEN ATTACHMENT FOR VEHICLE VENTILATOR WINDOWS
Filed Nov. 15, 1949     2 Sheets-Sheet 1
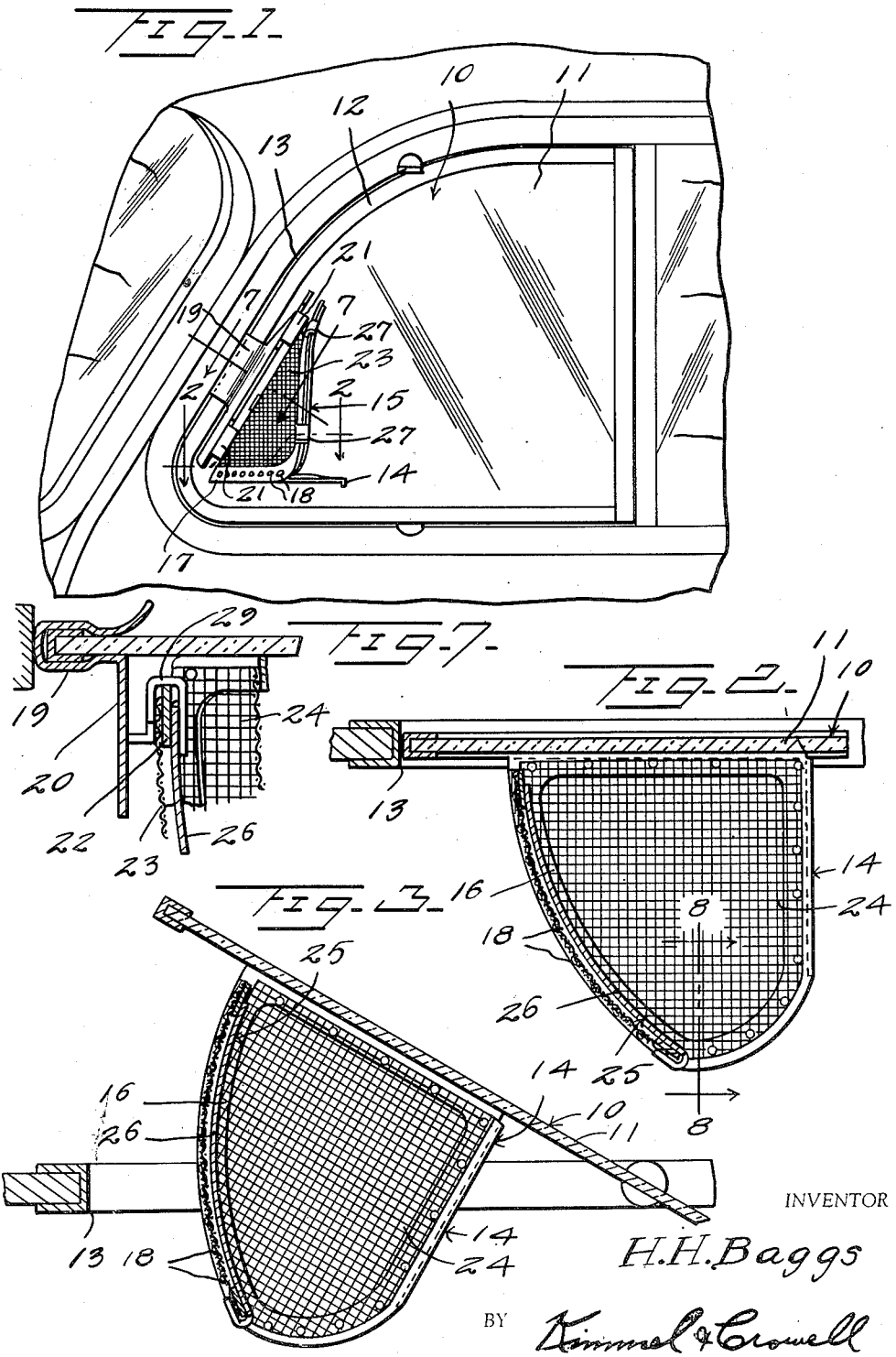
INVENTOR
H. H. Baggs
BY Kimmel & Crowell
ATTORNEYS March 6, 1951     H. H. BAGGS     2,544,003
SCREEN ATTACHMENT FOR VEHICLE VENTILATOR WINDOWS
Filed Nov. 15, 1949     2 Sheets-Sheet 2
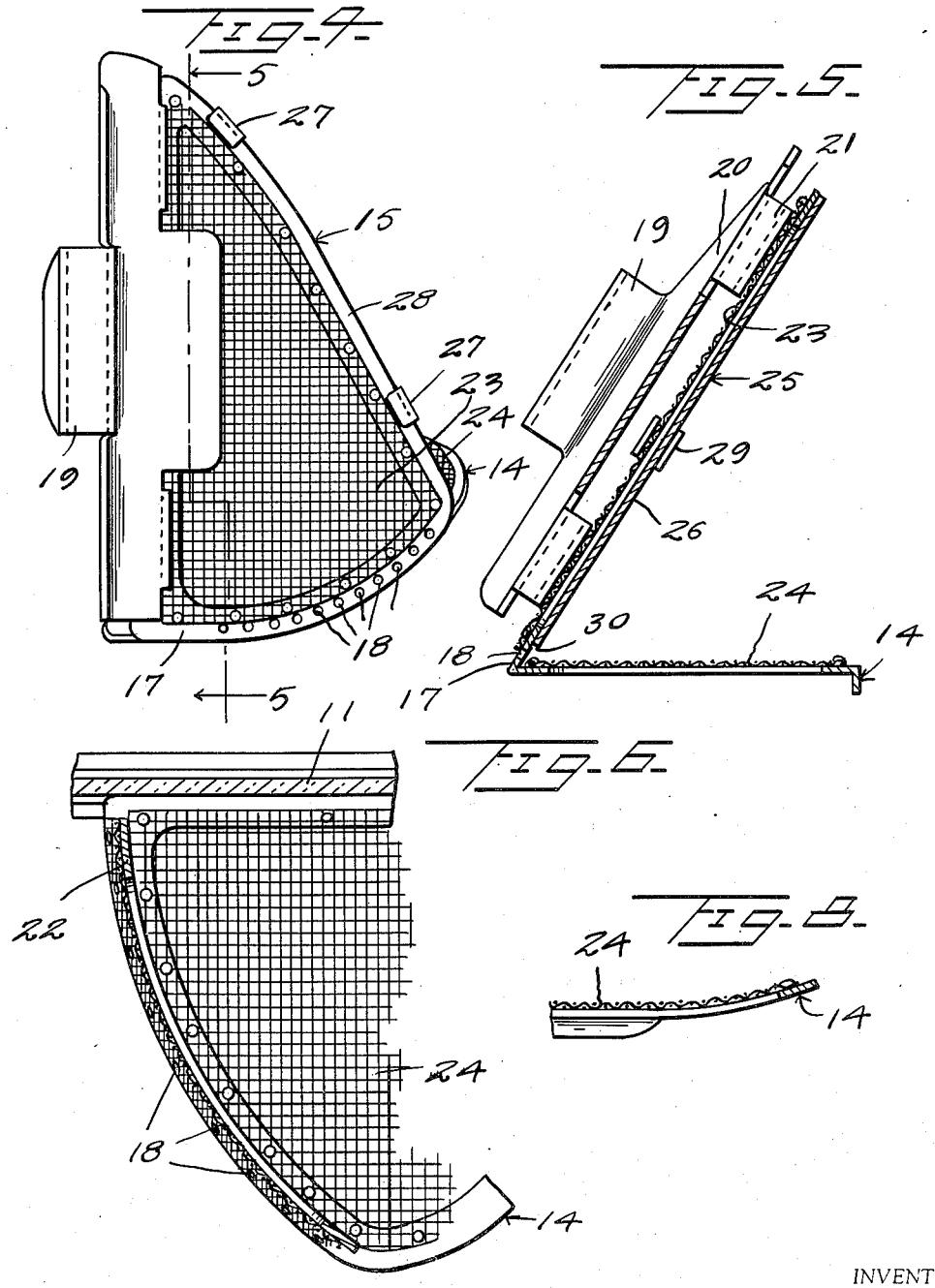
INVENTOR
H. H. Baggs
BY Kimmel & Crowell
ATTORNEYS Patented Mar. 6, 1951

2,544,003

UNITED STATES PATENT OFFICE 2,544,003

SCREEN ATTACHMENT FOR VEHICLE VENTILATOR WINDOWS

Harry H. Baggs, Yuma, Ariz.

Application November 15, 1949, Serial No. 127,330

3 Claims. (Cl. 296—44)

This invention relates to an attachment for the ventilator window of a vehicle.

An object of this invention is to provide an attachment for the ventilator window of a vehicle which is adapted to catch insects which are drawn into the vehicle by the draft of air created by the ventilator window when the latter is in an open position.

Another object of this invention is to provide an insect catching attachment which also includes a removable shield, which when in applied position will direct the flow of incoming air downwardly into the lower portion of the vehicle.

A further object of this invention is to provide in a device of this kind, means whereby the insects which are caught by the device will be removed therefrom when the ventilator window has been swung to the closed position.

With the above and other objects in view, my invention consists in the arrangement, combination, and details of construction disclosed in the drawings and specification, and then more particularly pointed out in the appended claims.

In the drawings,

Figure 1 is a fragmentary side elevation of a vehicle having a combined deflector and insect catching device mounted on the ventilator window thereof, the window being shown in closed position, Figure 2 is a fragmentary sectional view taken on the line 2—2 of Figure 1, Figure 3 is a horizontal section similar to Figure 2, showing the ventilator window in partly open position, Figure 4 is a detail front elevation of the device, Figure 5 is a sectional view taken on line 5—5 of Figure 4, Figure 6 is a fragmentary horizontal section similar to Figure 2, on an enlarged scale, with the shield removed, Figure 7 is a fragmentary sectional view taken on the line 7—7 of Figure 1, Figure 8 is a fragmentary sectional view taken on the line 8—8 of Figure 2.

Referring to the drawings, the numeral 10 designates generally a ventilator window mounted on the vertical axes and adapted at its forward end to swing inwardly of the vehicle. The ventilator 10 includes a transparent panel 11 which is mounted in a U-shaped metal frame 12, and the forward edges 13 of the panel and frame are disposed on a downward and forward inclination.

The ventilator structure herein disclosed is conventional and shows one application of a combined deflector and insect catcher or trap constructed according to an embodiment of this invention. A combined deflector and shield structure is removably mounted on the forward inclined edge of the ventilator 10 and comprises a lower frame 14 and a substantially triangular frame 15 extending from the forward longitudinally curved edge 16 of the lower frame 14. The lower bar 17 of the frame 15 is formed with a plurality of holes 18 the purpose for which will be hereinafter described.

A U-shaped resilient clamp 19 is adapted to engage about the frame 12 of the ventilator window and includes an elongated L-shaped bar 20 which is formed adjacent the opposite ends thereof with reverted members 21 adapted to be fixedly secured to the forward bar 22 of the frame 15. A screen 23 is soldered or otherwise fixed secured to the frame 15 and a lower screen 24 is soldered or otherwise fixedly secured to the lower frame 14.

An imperforate transversely bent shield 25 is adapted to be removably mounted on the inner side of the frame 15 and includes a substantially triangular plate 26 which has a pair of resilient clips 27 carried by the outer edge thereof, engageable over the outer bar 28 of the frame 15, and the shield 25 also has a inner clip 29 engageable over the inner edge of the frame 15 and over the screen 23. The lower edge 30 of the shield or deflector 25 terminates at a point slightly above the openings 18 in the lower frame bar 17 so that when the ventilator 10 is swung to a closed position with the device projecting outwardly of the ventilator, the air will pass through the openings 18 along the upper side of the screen 24 and will blow insects or the like off from the screen 24. In this manner the combined deflector and trap will be clean whenever the ventilator 10 is swung outwardly to a closed position.

In the use of this device the structure is clipped over the frame 12 of the ventilator 10, as shown in Figure 7, being disposed closely adjacent the lower forward portion of the ventilator 10. When the ventilator is swung inwardly at its forward end to an open position, the incoming air will strike the combined deflector and insect trap and any insects in the draft of air will be caught in the pocket formed by the two screens 23 and 24.

In the event it is desired to deflect the incoming air downwardly to the floor, the deflector or shield 25 may be clipped onto the frame 15. Any insects in the incoming air will then strike the deflector 25 and will drop downwardly into the pocket formed by the angle between the two screens 23 and 24. The outer side of the panel 11 forms the third or inner wall of the pocket. In the event it is desired to remove the insects from the trap, the ventilator 10 is swung outwardly to a closed position in order to dispose the screens 23 and 24 outside of the vehicle body.

When the vehicle is moving forwardly the air will pass through the screen cleaning openings 18 and blow any insects or other particles off from the lower screen 24.

I do not mean to confine myself to the exact details of construction herein disclosed, but claim all variations falling within the purview of the appended claims.

What I claim is:

1. A vehicle ventilator window attachment comprising a forward upwardly and rearwardly inclined frame, a lower substantially horizontally disposed frame extending rearwardly on an acute angle with respect to said forward frame, screens carried by each frame, and means securing said forward frame to the ventilator window, said forward frame having openings in the lower portion thereof whereby air will be directed over the upper side of said lower frame for cleaning off insects caught in the angle between said frames.

2. A vehicle ventilator window attachment comprising a forward upwardly and rearwardly inclined frame, a lower substantially horizontally disposed frame extending rearwardly on an acute angle with respect to said forward frame, screens carried by each frame, and a U-shaped resilient clip carried by said first mentioned frame securing said forward frame to the ventilator window, said forward frame having openings in the lower portion thereof whereby air will be directed over the upper side of said lower frame for cleaning off insects caught in the angle between said frames.

3. A vehicle ventilator window attachment comprising a forward upwardly and rearwardly inclined frame, a lower substantially horizontally disposed frame extending rearwardly on an acute angle with respect to said forward frame, screens carried by each frame, means securing said forward frame to the ventilator window, said forward frame having openings in the lower portion thereof whereby air will be directed over the upper side of said lower frame for cleaning off insects caught in the angle between said frames, a deflector plate, and means releasably securing said plate to said forward frame.

HARRY H. BAGGS.

REFERENCES CITED

The following references are of record in the file of this patent:

UNITED STATES PATENTS

| Number | Name | Date |
|---|---|---|
| 1,337,472 | Herbst | Apr. 20, 1920 |
| 1,982,455 | Sansbury | Nov. 27, 1934 |
| 2,041,998 | Finley | May 26, 1936 |
| 2,098,174 | Giberson | Nov. 2, 1937 |
| 2,224,433 | Holden | Dec. 10, 1940 |
| 2,478,161 | Russell | Aug. 2, 1949 |